(12) United States Patent
Humblot

(10) Patent No.: US 6,645,458 B1
(45) Date of Patent: Nov. 11, 2003

(54) METHOD FOR MAKING AN AQUEOUS SODIUM CHLORIDE SOLUTION

(75) Inventor: Cédric Humblot, Vincennes (FR)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 09/830,454

(22) PCT Filed: Oct. 21, 1999

(86) PCT No.: PCT/EP99/08144

§ 371 (c)(1),
(2), (4) Date: Jul. 25, 2001

(87) PCT Pub. No.: WO00/26140

PCT Pub. Date: May 11, 2000

(30) Foreign Application Priority Data

Oct. 30, 1998 (BE) .......................................... 09800787

(51) Int. Cl.$^7$ ................................................ C01D 3/00
(52) U.S. Cl. ................................ 423/499.4; 423/499.5; 423/50; 423/55; 423/87; 423/92; 423/104; 423/158; 423/140; 423/165
(58) Field of Search ............................... 423/50, 55, 87, 423/92, 104, 140, 158, 165, 499.4, 499.5

(56) References Cited

U.S. PATENT DOCUMENTS

| 4,155,820 A | 5/1979 | Ogawa et al. |
| 5,478,447 A | 12/1995 | Ninane et al. |
| 6,132,355 A | 10/2000 | Derie |

FOREIGN PATENT DOCUMENTS

| DE | 269608 | * | 7/1989 | .............. 423/499.5 |
| EP | 0 899 000 | | 3/1999 | |
| SU | 1225813 | * | 4/1986 | .............. 423/499.5 |

* cited by examiner

Primary Examiner—Steven Bos
(74) Attorney, Agent, or Firm—Larson & Taylor PLC

(57) ABSTRACT

Process for the manufacture of an aqueous sodium chloride solution, according to which a solid material comprising sodium chloride and heavy metals is dispersed in water, the aqueous medium thus obtained is alkalinized so as to precipitate the heavy metals in the form of metal hydroxides, calcium carbonate is coprecipitated with the metal hydroxides in the aqueous medium and the aqueous medium is then subjected to mechanical clarification.

8 Claims, 2 Drawing Sheets

METHOD FOR MAKING AN AQUEOUS SODIUM CHLORIDE SOLUTION

Figure 1:
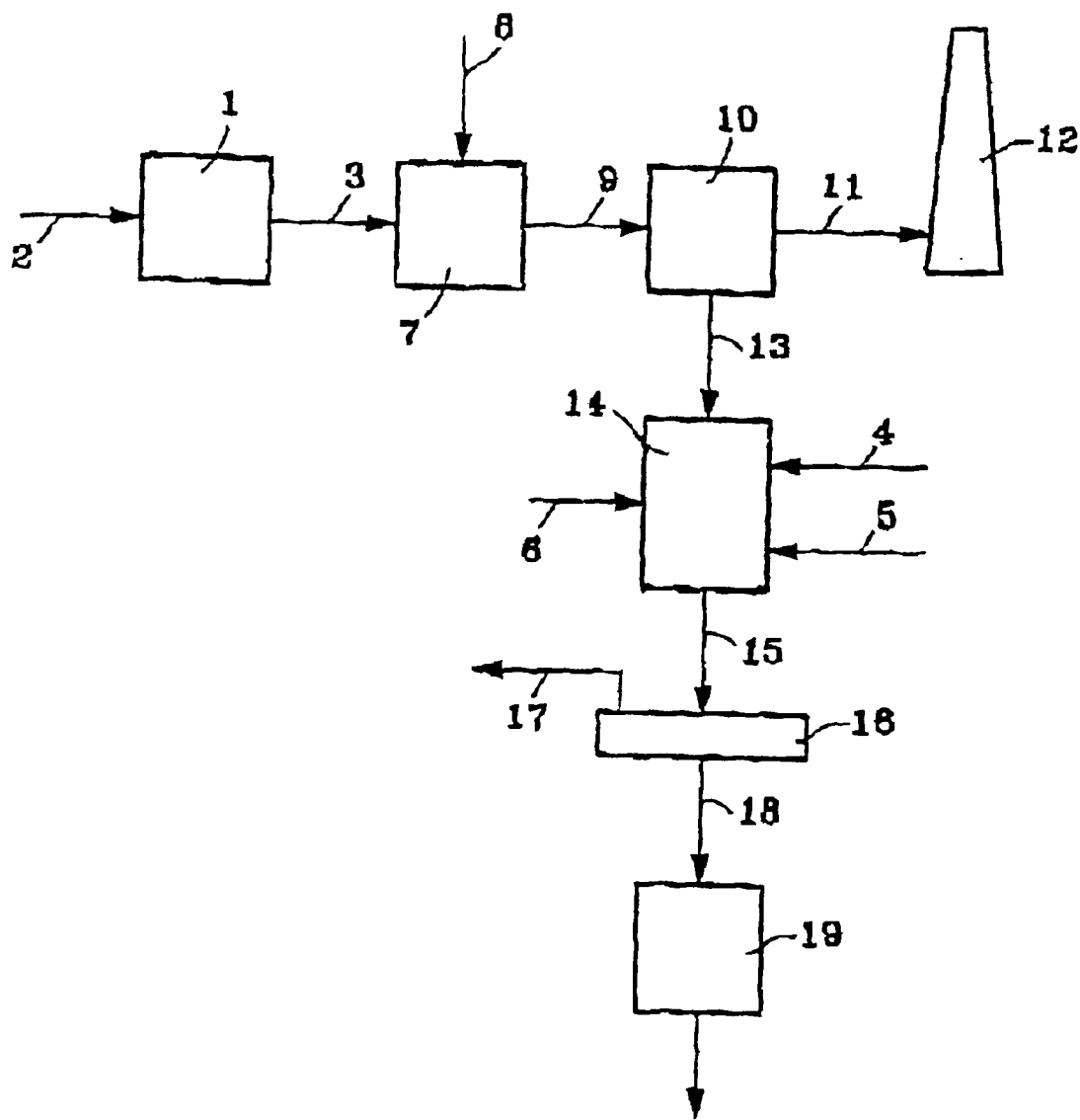

The invention relates to the manufacture of aqueous sodium chloride solutions starting with solid sodium chloride contaminated with heavy metals.

Waste of domestic or hospital origin usually contains substantial quantities of chlorinated compounds as well as heavy metals. Incineration of this waste consequently leads to the production of smoke contaminated with hydrogen chloride and heavy metals, and it is necessary to purify it before it is discharged into the atmosphere. A known technique for purifying such smoke consists in treating it, by the dry or semiwet route, with a basic sodium reagent, usually sodium bicarbonate or sodium carbonate [European Patent EP-B 0 603 218 by SOLVAY (Société Anonyme)]. The dust collected from this technique for purifying smoke contains an appreciable quantity of sodium chloride, which it is useful to upgrade for example in the form of aqueous solutions. This dust however also contains heavy metals whose presence should be avoided in aqueous sodium chloride solutions. According to a known process, the dust is dispersed in a sufficient quantity of water to dissolve the sodium chloride, and the aqueous medium thus obtained is supplemented with sodium or calcium hydroxide so as to alkalinize it and to precipitate the heavy metals in the form of metal hydroxides. The latter are then separated from the sodium chloride solution by means of filtration (European Patent EP-B 0 603 218 cited above).

An improved process has now been found for the manufacture of aqueous sodium chloride solutions starting with a solid material containing sodium chloride and heavy metals, which, all else being equal, makes it possible to obtain aqueous solutions whose degree of purity is higher than that obtained with the known process described above.

Consequently, the invention relates to a process for the manufacture of an aqueous sodium chloride solution, according to which a solid material comprising sodium chloride and heavy metals is dispersed in water, the aqueous medium thus obtained is alkalinized so as to precipitate the heavy metals in the form of metal hydroxides and the aqueous medium is then subjected to mechanical clarification. According to the invention, calcium carbonate is coprecipitated with the metal hydroxides in the aqueous medium.

In the process according to the invention, the solid material is usually in the form of a powder. Its origin is not critical. It is generally an industrial residue, for example a residue from the purification of an industrial fluid.

The solid material subjected to the process according to the invention contains sodium chloride and heavy metals. The expression heavy metals is intended to designate metals whose density is at least equal to 5 $g/cm^3$, as well as beryllium, arsenic, selenium and antimony, in accordance with the generally accepted definition (Heavy Metals in Wastewater and Sludge Treatment Processes; Vol. I, CRC Press, Inc; 1987; page 2). In the context of the present invention, aluminium is associated with heavy metals.

The respective quantities of sodium chloride and heavy metals in the solid material subjected to the process according to the invention are not critical and depend on its origin. For example, in the case of dust from the treatment of a gas containing hydrogen chloride, with a basic sodium reagent, the solid material usually contains at least 10 g of sodium chloride per kg (generally from 50 to 850 g/kg) and from 5 to 80 g of heavy metals per kg. The solid material may, in addition, optionally contain other water-soluble or water-insoluble constituents such as, for example, sodium sulphate, calcium carbonate and calcium sulphate. It usually contains sodium carbonate when it is obtained from the treatment of a gas containing hydrogen chloride; with a basic alkali metal reagent.

The water should be used in a sufficient quantity to dissolve all the sodium chloride. It is not advantageous to use an excess of water.

The alkalinization of the aqueous medium is designed to insolubilize the heavy metals by precipitating them in the form of metal hydroxides. It is normally carried out by adding a basic compound to the aqueous medium. Sodium hydroxide, in the solid form or in the form of an aqueous solution, is advantageously used. The alkalinization should be adjusted so as to insolubilize the heavy metals present in the aqueous medium and it therefore depends on the heavy metals present. In practice, good results are obtained by carrying out the alkalinization so that the pH of the aqueous medium is at least equal to 8 and does not exceed 14, preferably 12, the best results being obtained when the pH is between 9 and 12.

In the process according to the invention, mechanical clarification is an operating process in which a suspension of one or more solid substances in a liquid is subjected to physical separation into at least one phase which has a high concentration of solid substance and a liquid phase which is substantially free of solid substance, with no change of state of either constituent of the aqueous suspension, in particular without evaporation or solidification of the liquid. Examples of this operating process of clarification comprise filtration, centrifugation and sedimentation followed by decantation. Filtration is the preferred process, which may be optionally combined with centrifugation or with sedimentation followed by decantation.

In the process according to the invention, clarification is designed to separate the insoluble materials (particularly the precipitate of heavy metal hydroxides) from the aqueous sodium chloride solution.

In accordance with the invention, calcium carbonate is coprecipitated with the heavy metal hydroxides. This expression is understood to mean that calcium carbonate precipitates in the aqueous medium, at the same time as the heavy metal hydroxides.

Any appropriate means may be used to precipitate the calcium carbonate. According to a preferred embodiment of the invention, the calcium carbonate is precipitated by reacting sodium carbonate with calcium chloride and optionally other soluble salts of calcium (for example calcium sulphate) in the aqueous medium. In this embodiment of the invention, the respective quantities of calcium chloride and sodium carbonate are preferably close to the stoichiometric quantities necessary to form calcium carbonate by reaction.

According to a first variant of this embodiment of the process, the calcium chloride and the sodium carbonate are introduced simultaneously into the aqueous medium. According to another preferred variant of the process, the solid material contains sodium carbonate and calcium chloride is introduced into the aqueous medium. In this variant of the invention, the quantity of sodium carbonate in the solid material will depend on its origin. It is generally less than the quantity of sodium chloride and usually between 5 and 250 g per kg of solid material. In this variant of the invention, there is advantageously used a quantity of calcium chloride which is at least equal to the stoichiometric quantity necessary to form calcium carbonate by reaction with the entire sodium carbonate in the solid material. This variant of the process according to the invention applies in particular to the case of dust which is formed by subjecting smoke contaminated with hydrogen chloride and heavy metals to a treatment, by the dry or semiwet route, with a basic reagent comprising sodium carbonate or sodium bicarbonate. It also applies to the solid residues which are obtained by subjecting such smoke to washing with an aqueous sodium hydroxide solution.

In one particular embodiment of the process according to the invention, a hydraulic binder is added to the aqueous medium before clarification. The hydraulic binder may, for example, comprise lime, Portland cement clinker or Portland cement. Portland cement clinker is preferred. The role of the hydraulic binder is to form concrete with the precipitate collected from the clarification and from the water. The quantity of hydraulic binder which it is necessary to use will therefore depend on the composition of the solid material subjected to the process, more particularly on the quantity of heavy metals and of materials normally insoluble in water, which it contains. The optimum quantity of hydraulic binder should consequently be determined in each particular case by means of a routine work. In practice, in the majority of cases, good results are obtained using a quantity by weight of hydraulic binder which is substantially between 5 and 90% (preferably 10 and 60%) of the weight of dry matter of the abovementioned precipitate.

In this embodiment of the invention, any procedure may be used to introduce the hydraulic binder into the aqueous medium. A first procedure consists in dispersing the hydraulic binder into the aqueous medium. According to a second preferred procedure, the hydraulic binder is dispersed in the water at the same time as the solid material. To carry out this embodiment of the invention, it is possible to first of all mix the hydraulic binder with the solid material and to then disperse the mixture thus obtained in water.

All else being equal, the embodiment of the invention which has just been described facilitates the clarification stage and makes it possible to obtain an aqueous sodium chloride solution of higher purity.

According to an advantageous variant of this embodiment of the invention, the hydraulic binder comprises a pozzolanic compound, for example blast furnace slag or fly ash from thermal power stations for producing electricity. In this variant embodiment, the pozzolanic compound is advantageously used in a quantity by weight of 5 to 90% (preferably from 10 to 60%) of the weight of the dry matter of the precipitate collected upon clarification.

In another embodiment of the process according to the invention, the aqueous solution collected from the clarification is treated on a chelating resin so as to remove therefrom the last traces of heavy metals which were present therein in the dissolved state. The characteristic features and details relating to the treatment of the aqueous sodium chloride solution on the chelating resin are available in European Patent EP-603 218 [SOLVAY (Société Anonyme)].

The invention applies particularly well in the case where the heavy metals of the solid material comprise aluminium, arsenic, antimony, tin and zinc. The process according to the invention also shows good efficacy for purification with respect to iron, phosphorus and silicon. The invention finds advantageous use for the treatment of dust which is obtained by subjecting smoke, contaminated with hydrogen chloride and heavy metals, to a treatment, by the dry or semiwet route, with a basic sodium compound.

In this use of the invention, the sodium compound is, by definition, a chemical compound containing sodium. It is generally an inorganic compound and it is basic, such that it decomposes the hydrogen chloride present in the smoke, forming sodium chloride. The sodium compound generally constitutes more than 5010 (preferably at least 80%) of the weight of the basic reagent. It advantageously constitutes the bulk, or even the whole of the basic reagent. The sodium compound may, for example, comprise sodium hydroxide, anhydrous or hydrated sodium carbonate, sodium bicarbonate or a mixture of sodium carbonate and sodium bicarbonate, for example sodium sesquicarbonate which is a compound of general formula $Na_2CO_3.NaHCO_3.2H_2O$ obtained in particular from a trona ore as starting material. Sodium bicarbonate is preferred.

The expression treatment by the dry route is understood to mean a treatment in which the basic reagent is introduced, in the form of a solid powder, into the smoke, in the absence of a liquid, in particular of water. In general, in the treatment by the dry route, the basic reagent is used in the form of a powder which is injected into a stream of smoke circulating inside a reaction chamber.

The expression semiwet treatment is understood to mean a treatment in which the basic reagent is introduced into the smoke in the presence of a quantity of liquid (usually water) such that the latter is completely vaporized at the time the solid residue is recovered. In the treatment by the semiwet route, the basic reagent is generally used in the form of a powder dispersed in a liquid, generally water. Information relating to the treatment of the smoke with the basic reagent is available in European Patent EP-0 603 218 and international Patent Application WO 95/19835, both in the name of SOLVAY (Société Anonyme).

The use of the invention, which has just been described, finds advantageous application for smoke produced by the incineration of domestic or hospital waste comprising chlorinated compounds.

The aqueous sodium chloride solution obtained at the end of the process according to the invention is characterized by a very high purity and finds, as a result, various applications in industry. It can in particular serve as raw material for the manufacture of sodium carbonate by the ammonia-soda process (also called "SOLVAY Process") for the electrochemical manufacture of chlorine and of aqueous sodium hydroxide solutions, as well as for the manufacture of solid salt.

The characteristic features and details of the invention will emerge from the following description of the appended drawings.

Figure 2:
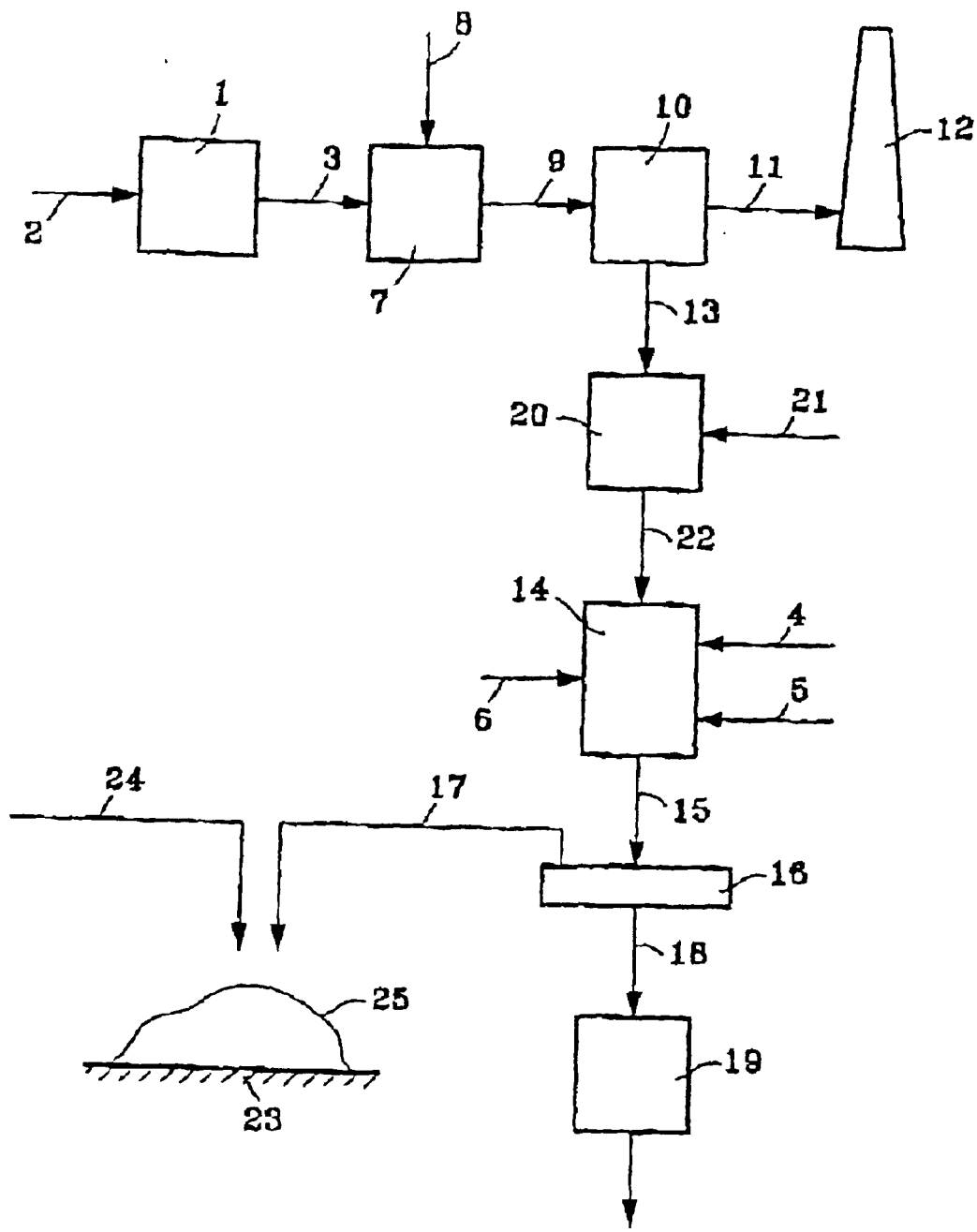

FIG. 1 schematically represents an embodiment of the process according to the invention;

FIG. 2 represents a variant embodiment of the process of FIG. 1.

In these figures, the same reference notations designate identical components.

The plan of FIG. 1 comprises a furnace 1 which is supplied with domestic or hospital waste 2. Smoke 3 emitted by the furnace 1 is contaminated with hydrogen chloride, volatile heavy metals and sulphur dioxide. It is moreover charged with ash containing heavy metals. It is introduced into a reaction chamber 7 where it is supplemented with sodium bicarbonate 8 in the form of a powder. Sodium bicarbonate is introduced into the smoke in a sufficient quantity to substantially decompose the entire hydrogen chloride and sulphur dioxide in the smoke and form sodium chloride and sodium sulphate. The smoke 9 recovered from the reaction chamber 7 is treated on a filter 10 so as to remove dust from it and the smoke thus freed of dust 11 is discharged into the chimney 12. The filter 10 preferably comprises a filter with filtering cloth (for example a bag filter).

The dust 13 retained on the filter 10 comprises sodium chloride, sodium sulphate, heavy metals and sodium carbonate derived from the excess sodium bicarbonate used in the reactor 7. They are introduced into a reaction chamber to which calcium chloride 4, sodium hydroxide 5 and water 6 are moreover introduced. The molar quantity of calcium chloride 4 is at least equal to the molar quantity of sodium carbonate in the dust 13. It is advantageously equal to the sum of the molar quantities of sodium carbonate and sodium sulphate in the dust 13. The water 6 is used in a sufficient quantity to dissolve the sodium chloride, sodium carbonate and sodium sulphate in the dust and to form an aqueous slurry which is pumpable. The sodium hydroxide 5 is used in a sufficient quantity to confer on the said aqueous slurry a pH value which is substantially between 8 and 12, so as to precipitate the heavy metals in the form of metal hydroxides. In the reaction chamber 14, the heavy metals in the dust precipitate in the form of metal hydroxides. During the precipitation of the heavy metal hydroxides, calcium carbonate and calcium sulphate precipitate, as a result of the reaction of calcium chloride with the sodium carbonate and sodium sulphate in the dust. The aqueous slurry 15 collected from the reaction chamber 14 is immediately treated on a filter 16 where a cake 17, on the one hand, and an aqueous solution of sodium chloride 18, on the other hand, are separated. The latter is then treated on a chelating resin 19 so as to remove therefrom the last traces of heavy metals which it contains in the dissolved state.

The variant embodiment schematically represented in FIG. 2 comprises a mixing chamber 20 upstream of the reaction chamber 14. In this mixing chamber, the dust 13 is mixed with a hydraulic binder 21, the latter advantageously consisting of a mixture of Portland cement and blast furnace slag. The pulverulent mixture 22, collected from the mixing chamber 20, is introduced into the reaction chamber 14 where it is subjected to the treatment described above with reference to FIG. 1. The cake 17 is placed on a spreading area 23 where it is sprayed with a sufficient quantity of water 24 to cause the setting and hardening of the hydraulic binder and to gradually form a solid and inert block 25. After grinding, the block 15 may be discharged into a rubbish dump, not represented.

The variant embodiment of FIG. 2 makes it possible to economically obtain aqueous sodium chloride solutions of high purity. It has the additional advantage of carrying out an economic discharge of the insoluble materials and the heavy metals in the dust resulting from the purification of smoke from incinerators of domestic or hospital waste.

The following examples serve to illustrate the invention.

Smoke from a domestic waste incinerator was treated with sodium bicarbonate in the dry state, and then filtered, as described above with reference to FIGS. 1 and 2. Dust predominantly containing sodium chloride, as well as sodium carbonate, sodium sulphate and heavy metals, is collected on the filter. The dust was introduced into a mixing chamber where it was mixed with Portland cement and fly ash from a thermal power station for the production of electricity. The pulverulent mixture thus obtained was divided into three batches which were then supplemented with water, sodium hydroxide and calcium chloride. The aqueous slurry obtained with each batch was homogenized and then subjected to filtration, from which an aqueous sodium chloride solution was recovered. Three successive trials were carried out separately with the three batches. The three trials differed from each other in the quantity of calcium chloride used.

In a first trial, 0.6 mol of calcium chloride was used per mole of sodium carbonate in the dust.

In a second trial, 0.85 mol of calcium chloride was used per mole of sodium carbonate.

In the third trial, 1 mol of calcium chloride was used per mole of sodium carbonate in the dust.

At the end of each trial, the composition of the aqueous sodium chloride solution obtained was analysed. The results of the analyses are mentioned in the following tables. The sodium chloride, sodium carbonate, sodium hydroxide and sodium sulphate contents of the aqueous solution are given in Table 1. The heavy metal contents of the aqueous solution are given in Table 2. The results obtained in the three trials show the improvement of the process according to the invention as regards the purity of the aqueous sodium chloride solution. Table 2 shows more particularly the advantage of using 1 mol of calcium chloride per mole of sodium carbonate in the dust.

TABLE 1

| Trial No. | $CaCl_2/Na_2CO_3$ molar ratio | NaCl (g/kg) | $Na_2CO_3$ (g/kg) | NaOH (g/kg) | $Na_2SO_4$ (g/kg) |
|---|---|---|---|---|---|
| 1 | 0.60 | 166.1 | 23.1 | 5.2 | 38.7 |
| 2 | 0.85 | 195.1 | 2.3 | 1.0 | 29.8 |
| 3 | 1.00 | 213.1 | 0.1 | — | 14.1 |

TABLE 2

| | Trial No. | | |
|---|---|---|---|
| | 1 | 2 | 3 |
| $CaCl_2/Na_3CO_3$ molar ratio | 0.60 | 0.85 | 1.00 |
| Al (mg/kg) | 6 058 | 885 | 0.98 |
| As (mg/kg) | 0.50 | 0.09 | <0.04 |
| Fe (mg/kg) | 0.47 | 0.09 | 0.05 |
| Hg (mg/kg) | 0.03 | 0.02 | 0.02 |
| Mn (mg/kg) | 0.11 | <0.02 | <0.02 |
| Mo (mg/kg) | 2.83 | 2.88 | 1.91 |
| Ni (mg/kg) | <0.16 | <0.11 | <0.11 |
| Pb (mg/kg) | <0.94 | <0.77 | <0.72 |
| Sb (mg/kg) | 5.5 | 3.65 | 0.11 |
| Sn (mg/kg) | 6.1 | <0.22 | <0.24 |
| Zn (mg/kg) | 8.6 | 0.81 | 0.21 |

What is claimed is:

1. A process for manufacturing an aqueous sodium chloride solution, comprising:

dispersing a solid material comprising sodium chloride and heavy metals in water to produce an aqueous medium;

introducing calcium chloride into the aqueous medium;

alkalizing the aqueous medium to precipitate the heavy metals in the form of metal hydroxides, calcium carbonate being coprecipitated with the metal hydroxides in the aqueous medium by reaction between the calcium chloride and sodium carbonate contained in the solid material; and subjecting the aqueous medium to mechanical clarification.

2. The process according to claim 1, wherein said aqueous medium is alkalinized to a pH value of between 8 and 12.

3. The process according to claim 1, wherein, in order to alkalinize the aqueous medium, sodium hydroxide is added thereto.

4. The process according to claim 1, wherein said clarification is performed by filtering said aqueous medium.

5. The process according to claim 1, wherein said solid material comprises from 50 to 850 g of sodium chloride per kg of solid material and from 5 to 80 g of heavy metals per kg of solid material.

6. The process according to claim 1, wherein said solid material comprises from 5 to 250 g of sodium carbonate per kg of solid material.

7. The process according to claim 1, further comprising dispersing a hydraulic binder in the aqueous medium in a quantity by weight of between 5 and 90% of the weight of the solid material in the dry state, before the step of alkalinizing.

8. The process according to claim 1, wherein said solid material comprises dust obtained by subjecting smoke, contaminated with hydrogen chloride and heavy metals, to a treatment, by the dry or semiwet route, with a basic sodium compound.

* * * * *